3,224,898
RELEASE-COATED CARRIER WEBS AND
METHOD OF USING SAME
Millard C. Spencer, South Portland, Maine, assignor to
S. D. Warren Company, Boston, Mass., a corporation
of Massachusetts
Filed Apr. 11, 1962, Ser. No. 186,659
11 Claims. (Cl. 117—76)

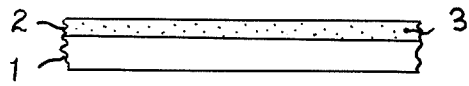
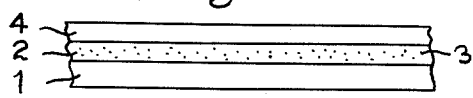
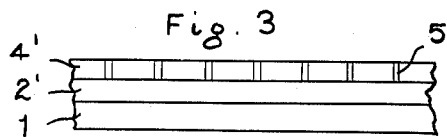
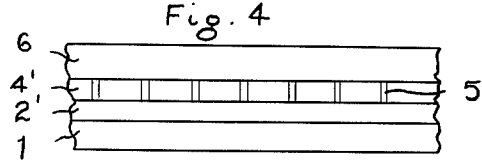
1 - PAPER BASE
2 - RELEASE COATING CONTAINING DISPERSED BLOWING AGENT
2'- RELEASE COATING AFTER ACTUATION OF BLOWING AGENT
3 - DISPERSED BLOWING AGENT
4 - RESINOUS COATING
4'- PERFORATED RESINOUS COATING
5 - PERFORATIONS
6 - EXPANDED PLASTIC (SPONGE)
INVENTOR.
Millard C. Spencer
BY
Pierce, Scheffler & Parker
Attorneys

United States Patent Office 3,224,898
Patented Dec. 21, 1965

This invention relates to the manufacture of air-permeable plastic films, to carrier sheets used to support such films in the course of their manufacture and to the process of making such films.

In one process for producing films or sheets or thermoplastic film-forming materials, such as vinyl resins for example, the film-forming material in liquid or pasty condition, usually a plastisol, is deposited or "cast" on a supporting surface, heated to consoldiate the film-forming material into a continuous self-supporting film, cooled, and stripped from the support. A material in wide use for supporting or carrying the film-former during the process of its consolidation is a web of paper or equivalent flexible material having a layer of "release coating" on its surface. A release coating is one from which the cooled consolidated film will readily part without being marred or distorted while parting is taking place. In other words, the film adheres sufficiently so that it will not fall off the release coating, but it can be pulled away from it without being damaged. Release-coated carrier paper of this general class is described in the U.S. Patent No. 2,676,118 of J. J. Thomas.

Films cast on release-coated carrier webs are of excellent quality and attractive appearance, and as heretofore produced are impermeable to air. In some cases, however, it is desirable to have such films permeable to air. One use in which an air-permeable film is desired is as a surface layer on foamed or expanded plastic material. Past practice in cases where an air-permeable film has been desired has been to puncture or "needle" the finished film as by running it over a roller having sharp pins projecting from its surface.

An object of this invention is to provide a process in which the property of air-permeability is incorporated in a thrmoplastic film while said film is being consolidated on a carrier web.

Another object is to provide air-permeability in a thermoplastic film by passing gas through said film before consolidation of said film has been completed.

Another object is to provide a release-coated carrier web for plastic film, said carrier web containing a blowing agent capable of liberating gas during its use as carrier web for the production of plastic film thereon.

Another object is to provide a release coating which contains a blowing agent.

Speaking generally the process of the present invention comprises spreading upon a flexible carrier web a layer of thermoplastic film-forming material in unconsolidated liquid or pasty condition, heating the layer to consolidate it to a film and prior to completion of the consolidation process, causing gas to pass through the forming film to leave minute holes therein.

The preferred method of carrying out the process is to use as a carrier web a flexible web, e.g. a paper web, bearing on its surface a release coating that contains a blowing agent which upon being heated to a critical temperature suddenly decomposes and releases gas while a thermoplastic film is being consolidated in contact with said release coating, whereby tiny holes or perforations are formed in said film prior to completion of its consolidation.

Blowing agents are in common use in the production of sponge or foam rubber and foam plastics. Such agents may be considered to be mild explosives which when heated to a critical temperature decompose suddenly with evolution of gas. Inorganic compounds such as sodium bicarbonate and ammonium carbonate are sometimes used as blowing agents. But compounds most commonly used are compounds which release nitrogen, such as azo compounds, guanyl compounds, sulfonhydrazides, and the like. When used to produce foamed or expanded plastics the blowing agent is incorporated in the resinous plastisol from which the foamed plastic is formed, and it decomposes and causes expansion of the plastic during the period while the plastic is taking its final shape.

According to the present invention the blowing agent is not incorporated in the material from which the plastic film is to be made. On the contrary it is included in the release coat surface against which the film is formed. A liquid or semi-liquid composition of film-forming substance is spread upon the surface which contains the blowing agent. Before the film-former has become consolidated the temperature of the blowing agent is raised until the agent suddenly releases gas which passes through the forming film and renders it porous. The film-former can then be further heated to cure and solidify it with the holes or porosities still remaining substantially unchanged therein.

If desired, the cured porous film can be pulled away from the release-coat of the supporting surface. Alternatively, a layer of sponge rubber or foamed plastic can be adhered to or formed in contact with the said porous film, and the entire composite plastic laminate can then be removed from the release-coat surface of the supporting web or member.

The invention described above is diagrammatically illustrated in the accompanying drawings in which FIG. 1 is an edge view of a paper base having on a surface thereof a release coating containing a dispersed blowing agent, FIG. 2 is an edge view showing the paper base, the release coating containing the dispersed blowing agent as in FIG. 1 and a superposed resinous coating, FIG. 3 is an edge view showing the paper base as in FIG. 1, the release coating after the blowing agent has been actuated and the resin coating after it has been perforated, and FIG. 4 is an edge view of the paper base, the release coating and the perforated resin coating as in FIG. 3 with a superposed layer or body of expanded plastic or sponge.

In the drawings 1 is the paper base, 2 is the dried release coating containing dispersed particles 3 of blowing agent, 2' is the release coating after the blowing agent has been actuated, 4 is the unconsolidated resin coating, 4' is the perforated and consolidated resin coating having the perforations 5, and 6 is the expanded plastic or sponge coating.

For the very great majority of cases the carrier medium which bears the release coating containing the blowing agent, will from reasons of economy be a paper web. The web should be dense enough so that it is not readily permeable by gas. Advantageously it may be paper which has been base-coated as by a layer of clay and casein coating, or any coating, before the top release-coating is applied.

It is apparent that the blowing agent should be distributed substantially uniformly throughout the surface of the release-coat. It should also be in finely divided or dispersed condition. The solid crystals of the blowing agent can usually be ground to fine size under water. Since the blowing agents are rather unstable compounds, however, it usually is preferable to incorporate the agent in the release coating composition in solution or emulsified solution. Hence as the release coating dries the agent will be deposited in very finely divided condition throughout said release coating.

The optimum quantity of blowing agent to be incorporated in the release-coating will depend upon various factors, including the particular blowing agent selected, the thickness of the plastic film to be formed on the release surface, and the degree of porosity or permeability desired in said plastic film. Speaking generally, the quantity of blowing agent will rarely, if ever, exceed 50% of the dry weight of the release coating and in most cases it will be substantially less than that amount.

The choice of the particular blowing agent to be used will be governed by several factors, including the specific release coating used, the specific film-former to be processed, and the maximum permissible temperature to which the system can be subjected. It is apparent that a blowing agent which is decomposed by acid cannot be used in an acidic medium such as, for instance, that required when stearato-chromic chloride is the chosen release agent in the release coating. Conversely it is inadvisable to select for use in a strongly alkaline medium, such as a solution of sodium methyl siliconate release agent, a blowing agent which is highly unstable under alkaline conditions. The blowing agent must be chosen to be compatible with the release coating composition.

One embodiment of the invention is described in the following example. In this example all "parts" are parts by weight.

A solution was made of 10 parts of polyvinyl alcohol in 115 parts of water. The pH of the solution was adjusted to 3.8 by addition of hydrochloric acid.

Another solution was made by mixing 10 parts of "Quilon," a 30% solution of stearato-chromic chloride in acidic isopropanol, and 105 parts of water. To this was added 10 parts of a 22% solids buffering solution containing urea, sodium formate, and a trace of formic acid. The resulting pH value of the buffered Quilon solution was 3.8. Into this was stirred 5 parts of "Nitrosan" a commercial blowing agent consisting of 70% finely divided N,N'-dimethyl-N,N'-dinitroso terephthalamide protected by 30% of inert mineral oil. Quilon and Nitrosan are both trade names of products sold by E. I. du Pont de Nemours & Co.

The two solutions were mixed together to form a single release-coating composition. This was applied by means of an air-knife coating device to the surface of a calendered clay-and-casein coated paper web to form a release coated carrier web. The quantity of release composition applied amounted to 3 grams per square meter, dry weight. The coated web was dried at 100° C. to eliminate water, and then was supercalendered to render it smooth and flat. Thereafter there was spread on the release-coated carrier web by means of a blade coater a layer about 3 mils in thickness of a vinyl plastisol comprising powdered polyvinyl chloride dispersed in dioctyl phthalate. The web was then heated momentarily to a temperature of 200° C. to liberate nitrogen from the Nitrosan in the release coating. The gas penetrated through the vinyl plastisol, leaving minute holes therein. The web was then further heated at about 300° C. to consolidate or blend together the ingredients of the plastisol layer into a film of uniform composition. This process of consolidation did not to a perceptible degree close the perforations previously formed in the plastisol layer by passage of the nitrogen gas therethrough.

The consolidated porous film could then be readily peeled from contact with the release coated carrier web. Alternatively, to a portion of the film before removal from the carrier web there was applied a layer of conventional mixture for producing foamed or expanded sheeting, comprising the blowing agent azobisisobutyronitrile in a plastisol of powdered polyvinylchloride dispersed in dioctyl phthalate. This layer was then covered by a web of cloth backing, and the composite web was heated to about 150° C. to cause liberation of gas by the blowing agent in and consequent expansion or thickening of the intermediate resinous layer. After a further period of heating to cure the intermediate resinous layer, the composite sheet was separated from the release-coated carrier web. The surface or skin released from the carrier was glossy, hard, and tough. The pores were not visably noticeable; but upon change of pressure or temperature, air readily passed through the outer skin. Thus the relatively weak intermediate layer of highly expanded foam plastic was protected on one side by the tough porous film and on the other side by a layer of cloth.

It is apparent that the quantity of blowing agent used in the release coating will be governed in part by the specific agent chosen, the degree of porosity desired in the film to be formed in contact with the release coat, and to some extent upon the temperature at which the gas is released by the blowing agent.

It is advantageous to have the blowing agent in the release coat in a very finely divided condition. A preferred way to ensure that condition is to dissolve the blowing agent in a solvent, and then emulsify that solution in aqueous medium. The resulting emulsion then can readily be incorporated in an aqueous release coating composition.

An effective procedure to achieve sudden release of gas from the blowing agent is to run the carrier web with the layer of unconsolidated plastic thereon with the reverse side of said web in contact with a roll or other surface heated well above the decomposition temperature of the blowing agent. Thus momentary contact for even a few seconds suffices to cause evolution of the gas.

At the present time polyvinyl polymers or copolymers are the ones most commonly used for making plastic films and foamed plastics. But acryl polymers, vinylidene polymers, and polyurethane resins are being used with similar techniques, and the release papers of the present invention are also usable with these other film forming materials.

I claim:

1. A carrier web bearing on its surface a dry and hard layer of release coating containing dispersed therein a finely divided blowing agent.

2. A carrier web bearing on its surface a dry and hard layer of release coating capable of suddenly releasing gas when heated to a critical temperature.

3. A carrier web comprising a flexible base having on a surface thereof a dry and hard layer of coating which is only weakly adherent to organic film or sheet material formed thereon, said coating having dispersed therein a predetermined quantity of finely divided substance which upon reaching a critical temperature suddenly releases gas.

4. Process which comprises spreading upon the surface of a carrier web a release coating in liquid form containing a blowing agent in dispersed form and drying and hardening said coating at a temperature below that at which said blowing agent is activated.

5. Process which comprises spreading upon a carrier web having a dry and hard release coating thereon a layer of powdered resin dispersed in a liquid, passing a gas from said release coating through said layer to form perforations therein, heating said layer to cause dissolution of said resin in said liquid to form a tough film without closing said perforations, and thereafter stripping said film from said carrier web.

6. Process which comprises spreading upon a carrier having a release surface a layer of resinous material in unconsolidated condition, forming perforations in said layer, and thereafter consolidating the material in said layer without closing said perforations.

7. Process which comprises spreading upon a carrier having a release surface a layer of unconsolidated plastisol, passing gas through said layer to cause perforations therein, and thereafter hardening said layer without closing said perforations, 8. Process of making an air-permeable plastic film which comprises spreading a layer of a plastisol containing powdered resin dispersed in a plasticizer upon the surface of a carrier web coated with a release coating to which a plastic film adheres only weakly, said coating containing a blowing agent capable of suddenly releasing gas upon being heated to a critical temperature, heating said coated web carrying said layer of plastisol above said critical temperature whereby gas is released which penetrates said layer of plastisol and forms minute holes therein, further heating said layer of plastisol to consolidate the same into a tough film without closing said holes, and thereafter removing the said film from said carrier web.

9. Process which comprises applying to a paper web a layer of release coating composition containing dispersed therethrough finely divided blowing agent, drying and hardening said layer at a temperature below the critical decomposition temperature of said blowing agent, thereafter applying to the said release-coated surface a layer of resinous film-forming material in unconsolidated condition, heating the coated web to cause evolution of gas by the blowing agent whereby the layer of unconsolidated resinous film-forming material is perforated by passage of gas therethrough, further heating said layer to consolidate the film forming material, firmly affixing to the free surface of the consolidated film so formed a layer of expanded plastic, and thereafter stripping the release-coated paper web from the resulting composite web of consolidated film and expanded plastic.

10. As a new product a carrier web having a release coating thereon, and on said release coating and adherent thereto, a perforated film of a film-forming material.

11. As a new product a carrier web having a release coating thereon, a perforated film of a film-forming material adhered to said release coating and a layer of expanded plastic adhered to said film.

References Cited by the Examiner
UNITED STATES PATENTS 2,866,717  12/1958  Bristol _____ 117—10
2,894,855   7/1959  Wilhelm et al. _____ 117—119.6

RICHARD D. NEVIUS, *Primary Examiner.*